(12) United States Patent
Janson

(10) Patent No.: US 8,495,578 B2
(45) Date of Patent: Jul. 23, 2013

(54) INTEGRATED SOFTWARE DEVELOPMENT SYSTEM, METHOD FOR VALIDATION, COMPUTER ARRANGEMENT AND COMPUTER PROGRAM PRODUCT

(75) Inventor: Philippe A. Janson, Wadenswil (CH)

(73) Assignee: International Business Machines Corporation, Armonk, NY (US)

( * ) Notice: Subject to any disclaimer, the term of this patent is extended or adjusted under 35 U.S.C. 154(b) by 1813 days.

(21) Appl. No.: 11/311,791

(22) Filed: Dec. 19, 2005

(65) Prior Publication Data
US 2007/0168917 A1    Jul. 19, 2007

(51) Int. Cl.
*G06F 9/44*    (2006.01)
(52) U.S. Cl.
USPC ........... 717/126; 717/100; 717/106; 717/107; 717/108; 717/124
(58) Field of Classification Search
USPC ................................. 717/107, 126
See application file for complete search history.

(56) References Cited

U.S. PATENT DOCUMENTS

| 7,206,387 | B2 | 4/2007 | Jan et al. | |
|---|---|---|---|---|
| 2002/0104071 | A1* | 8/2002 | Charisius et al. | 717/109 |
| 2003/0226115 | A1* | 12/2003 | Wall et al. | 715/526 |

OTHER PUBLICATIONS

Brett McLaughlin, Validation with Java and XML Schema, Parts 1-4, JavaWorld, Sep. 2000.*

* cited by examiner

*Primary Examiner* — Emerson Puente
*Assistant Examiner* — Jonathan R Labud
(74) *Attorney, Agent, or Firm* — Daniel P. Morris; McGinn IP Law Group, PLLC

(57) ABSTRACT

The invention relates to an integrated software development system 4, comprising an interface description language adapted to specify constraints on input parameters, a program analyzer 6 adapted to identify input parameters of a software program 7, and a validation enforcement system 5 adapted to enforce that an interface description 8 in the interface description language complying with a predefined set of validation rules 9 is provided for the input parameters of the software program 7.
The invention further relates to a method for validation, a computer arrangement and a computer program product.

1 Claim, 5 Drawing Sheets

FIG 2 (Prior Art)

```
<?xml version="1.0"?>
<schema targetNamespace="http://example.com/stockquote/schemas"
    xmlns="http://www.w3.org/2000/10/XMLSchema">

<element name="TradePriceRequest">
        <complexType>
            <all>
                <element name="tickerSymbol" type="string"/>
            </all>
        </complexType>
    </element>
    <element name="TradePrice">
        <complexType>
            <all>
                <element name="price" type="float"/>
            </all>
        </complexType>
    </element>
</schema>
```

FIG 3

```
       ┌ <?xml version="1.0"?>
   21 ┤  <schema targetNamespace="http://example.com/stockquote/schemas"
       └      xmlns="http://www.w3.org/2000/10/XMLSchema">

┌ <element name="TradePriceRequest">
       │   <complexType>
       │     <all>                                     /24
       │       <element name="tickerSymbol">
       │         <simpleType>
       │              ┌ <restriction base="string">
   31 ┤      33 ┤      <length value="3"/>
       │              └ </restriction>
       │         </simpleType>
       │       </element>
       │     </all>
       │   </complexType>                /25
       └ </element>
       ┌ <element name="TradePrice">
       │   <complexType>
       │     <all>
       │       <element name="price">
       │         <simpleType>
       │              ┌ <restriction base="float">
   32 ┤      34 ┤      <minExclusive value="0"/>
       │              └ </restriction>
       │         </simpleType>
       │       </element>
       │     </all>
       │   </complexType>
       └ </element>
         </schema>
```

30

24 → element name="tickerSymbol"
25 → element name="TradePrice"

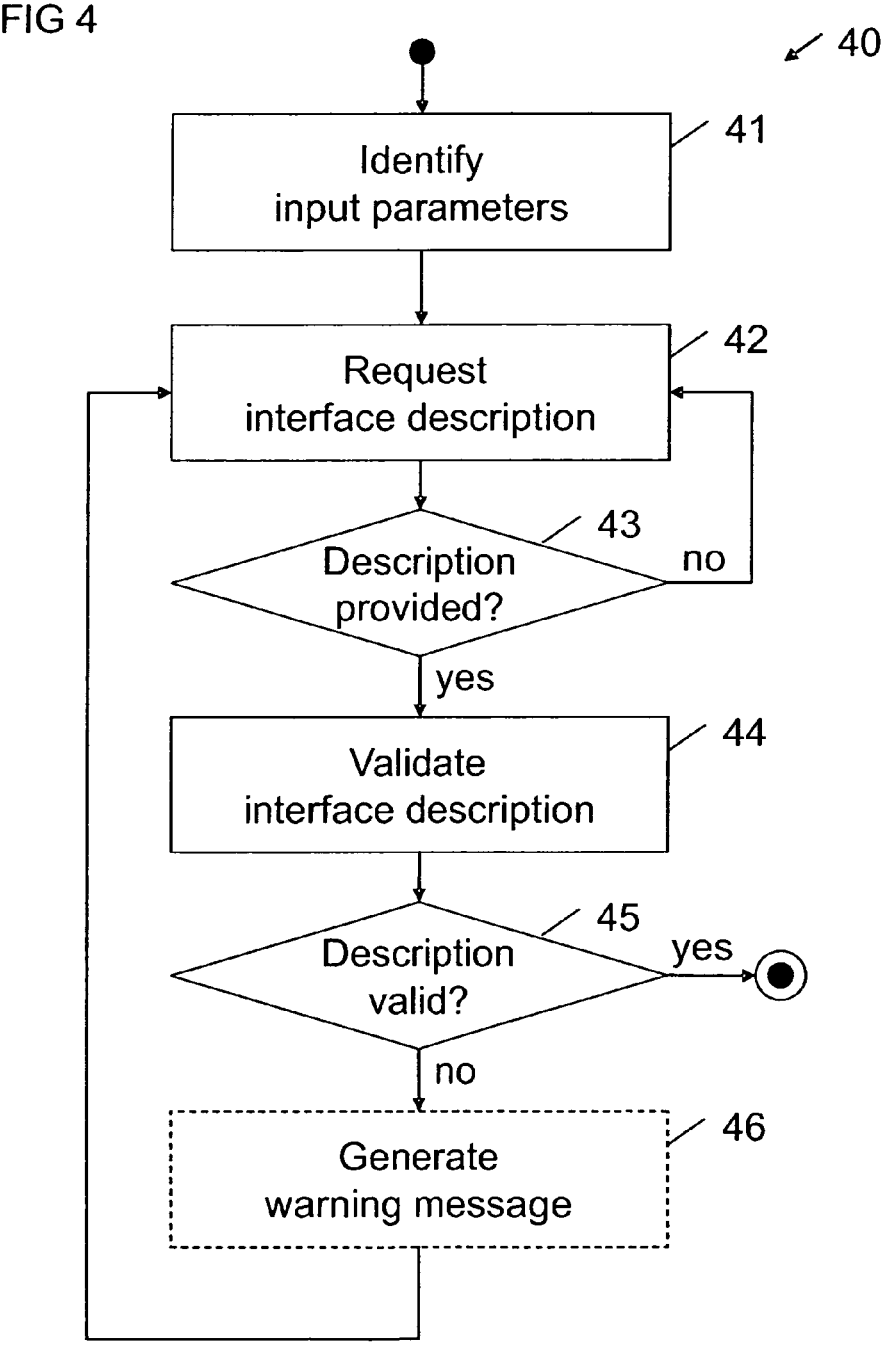

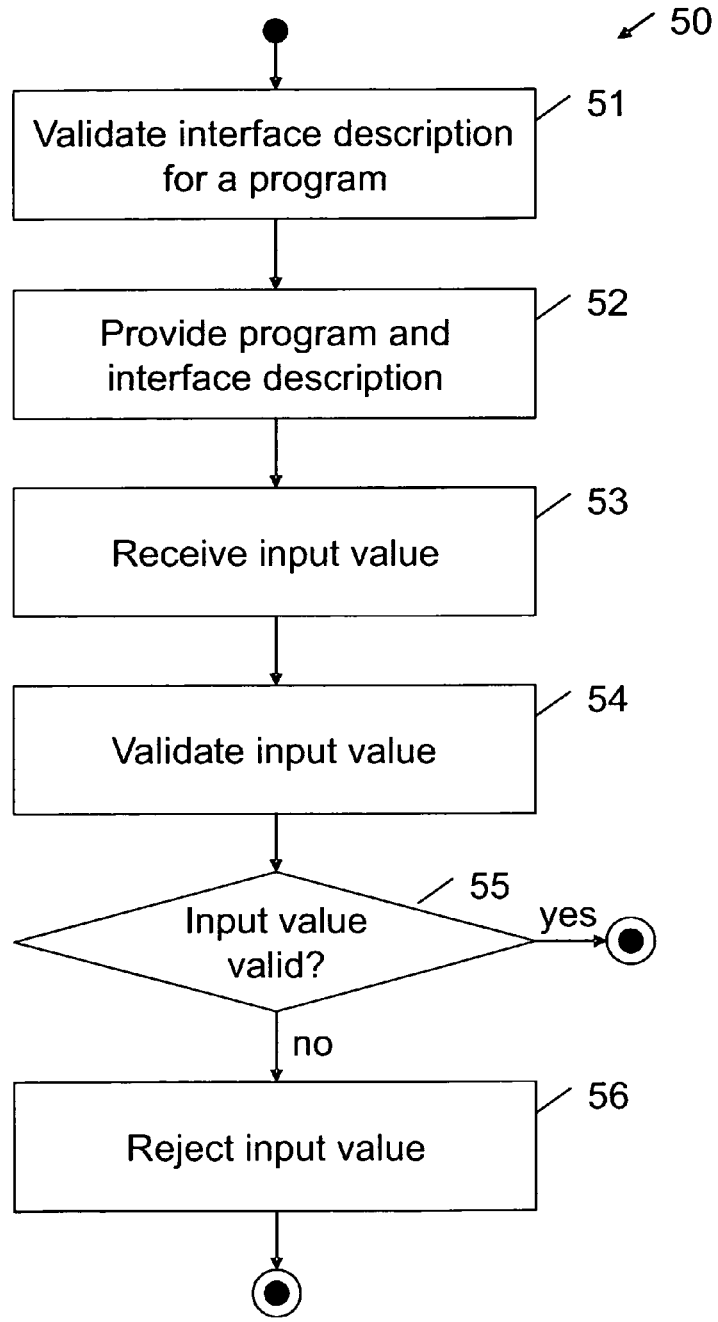

INTEGRATED SOFTWARE DEVELOPMENT SYSTEM, METHOD FOR VALIDATION, COMPUTER ARRANGEMENT AND COMPUTER PROGRAM PRODUCT

TECHNICAL FIELD

The invention relates to an integrated software development system comprising an interface description language adapted to specify constraints on input parameters of software programs. The invention further relates to a method for validation, a computer arrangement and a computer program product.

BACKGROUND OF THE INVENTION

Validation of input parameters is an area of great importance in computer programming. Traditionally, input validation was used as safeguard against user errors, in particular in times of uncomfortable and error prone user interfaces such as command line parameters or parameter files, especially in batch processing. This was done as the provision of incorrect input parameters often resulted in program crashes, associated with a loss of work time, among others.

Although nowadays user interfaces have improved considerably, incorrect input parameters are still a major problem in program development. In addition to the existing problems, the validation of input parameters has actually gained importance due to the spread of data networks such as the Internet. Loosely coupled, distributed computer programs exchange input and output parameters over data networks, often using some open and sometimes poorly defined protocols. It is known that distributed programs, particularly programs running in an open network environment like the Internet, are vulnerable to attacks by malicious users or viruses. In particular, web applications such as home banking or online shops accepting input parameters provided over data network interface can be manipulated by sending a maliciously crafted input parameter to the program.

A well known example of such an attack is the exploitation of buffer overflows. By providing a very large or non-terminated input parameter to a program, it often fails upon evaluation of the input parameter, sometimes resulting in a crash of security critical programs or systems. This can be exploited as a means of disabling security measures, among other things.

A second, related attack scenario is to provide an input parameter that will result in the execution of a control statement provided as part of the input parameter. Such an attack is commonly referred to as an injection attack, where a foreign, typically user provided control statement is injected in a typically programmer provided control statement.

In order to prevent these and other negative effects of any incorrect input parameters provided to a computer program, the provided input parameters need to be validated. One approach to the problem is for the computer programmer of the particular computer program to write validation code specific to the validation of all received input parameters. This, however, is tedious for the programmer and often results in incomplete validation of provided input parameters, as the application programmer is usually more concerned with the application logic than with the validation of input parameters.

A second approach is based on validating input parameters before they are actually passed on to a program. By providing a formal interface description of what input parameters a computer program actually expects, an automatic input validation can in principle be performed. For example, the IBM XML4J parser, described in Brett McLaughlin's "Java & XML—Solutions to Real-World Problems", 2nd Edition, .ISBN 0-596-00197-5, can be used to validate input parameters with respect to an interface description. Consequently, the application programmer is relieved of the duty of writing code for validation of input parameters.

However, the programmer has to provide a formal interface description of the expected input parameters instead. Such a formal description can be given, for example, in the Web Service Description Language (WSDL), an open standard for defining the allowable input and output parameters of a web service accessible by the Simple Object Access Protocol (SOAP). Because both WSDL and SOAP are based on the Extensible Markup Language (XML), the formal description of parameters specified in a WSDL file is based on the XML Schema language.

XML Schema can serve a very powerful interface description language, which allows the exclusion of almost any kind of malicious input. However, it has a very complex syntax and can not easily be written by many application programmers. In consequence, many programmers only provide poor interface descriptions for the expected input parameters of their programs. For example, they just specify that the expected input parameter has the form of a character string. Such formal interface descriptions cannot, however, prevent the acceptance of potentially malicious input parameters.

Consequently, it is a challenge to provide improved software development systems and an improved method for validation.

SUMMARY OF THE INVENTION

According to a first aspect of the invention, an integrated software development system comprising an interface description language adapted to specify constraints on input parameters, a program analyzer adapted to identify input parameters of a software program and a validation enforcement system adapted to enforce that an interface description in the interface description language complying with a set of predefined validation rules is provided for the input parameters of the software program.

By providing an integrated software development system with a validation enforcement system that validates that an interface description complies with a predefined set of validation rules the provision of poorly written interface descriptions can be prevented. The set of predefined validation rules can be provided, for example, by the manufacturer of the integrated software development system. Consequently, the responsibility of defining rules of what constitutes a valid interface description can be shifted from the application programmer to a specialist in software security.

According to an improved embodiment of the first aspect, the integrated software development system further comprises a code generator adapted to generate executable program code for the software program. The generation of code is prevented if the validation enforcement system is unable to validate the interface description successfully against the predefined set of validation rules.

Accordingly, no executable program code can be generated before a provable valid interface description for a software program has been provided.

According to a further advantageous embodiment of the first aspect, the integrated software development system further comprises a software deployment system adapted to deploy a software program to a target system. The deployment of the software program is prevented if the validation enforcement system is unable to validate the interface description successfully against the predefined set of validation rules.

By integrating the software deployment system into the integrated software development system, the deployment of the software program can be prevented unless a provable correct interface description for the software program is provided.

According to a second aspect of the present invention, a method for enforcing input validation is provided. The method comprises the steps of identifying input parameters of a software program, requesting an interface description for the software program in an interface description language adapted to specify constraints on the identified input parameters, and validating that the interface description complies with the input parameters of the software program and a set of predefined validation rules.

By requesting and validating an interface description for the input parameters of a software program, the correctness and completeness of the interface description with respect to a predefined set of validation rules and the software program can be verified. According to an improved embodiment of the second aspect, the step of identifying input parameters comprises analyzing the software program in order to identify its input parameters.

By analyzing the software program, its input parameters can be detected automatically and completely without programmer interaction and the potential risk of mistakes made by the programmer. Such a program analysis can be performed, for example, during parsing of source code.

According to an improved embodiment of the second aspect, the step of identifying input parameters comprises requesting the input parameters of the software program.

By requesting the input parameters of the software program, the software development system can be made aware of what serves as input to the software program. The requested data can be used, for example, for automatic source code generation.

According to an improved embodiment of the second aspect, the method further comprises the step of generating a warning or error message, if no interface description is provided for a software program or if a provided interface description is not valid with respect to the input parameters or the set of validation rules.

By generating a warning or error message, a programmer of a software program can be warned about the incompleteness of his interface description and be made aware of the resulting possibility of attacks to the software program using maliciously crafted input.

According to a further improved embodiment of the second aspect, the method further comprises the steps of receiving an input value for the computer program, validating the received input value against the interface description and rejecting the received input value, if the input value violates any of the constraints specified on a corresponding input parameter in the interface description.

By validating a received input value against the provided interface description, potentially malicious input values violating the provided interface description can be identified and prevented from being delivered to the computer program.

According to a third aspect of the present invention, the computer arrangement is provided, comprising a server computer comprising a server program and an interface description adapted to specify constraints on input parameters of the server program, an interface adapted to receive input values for the server program, a client computer comprising a client program, adapted to transmit input values to the interface, and a validation system adapted to only forward input values received from the client program by the interface to the server program that comply with all constraints specified on corresponding input parameters of the server program by the interface description.

By providing an arrangement comprising a server and a client program and placing an interface with an associated validation system between the client and a server program, input values sent from the client program to the server program can be filtered. By filtering out input values violating any of the constraints of an associated interface description, potentially malicious input values can be excluded from being forwarded as input parameters to the server program.

According to a fourth aspect of the present invention a computer program product comprising a computer readable medium embodying program instructions executable by a computer to perform a method according to the second aspect of the invention is provided.

By providing a computer program product with a computer readable medium, a program performing a method in accordance with an embodiment of the present invention can be provided to a computer system.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating:

FIG. 2, an interface description, which accepts potentially harmful input values, FIG. 3, an interface description, which rejects potentially harmful input values, FIG. 4, a flow chart of a first method for validation of an interface description, FIG. 5, a flow chart of a second method for validation of input values.

DETAILED DESCRIPTION OF THE DRAWINGS

Figure 1:
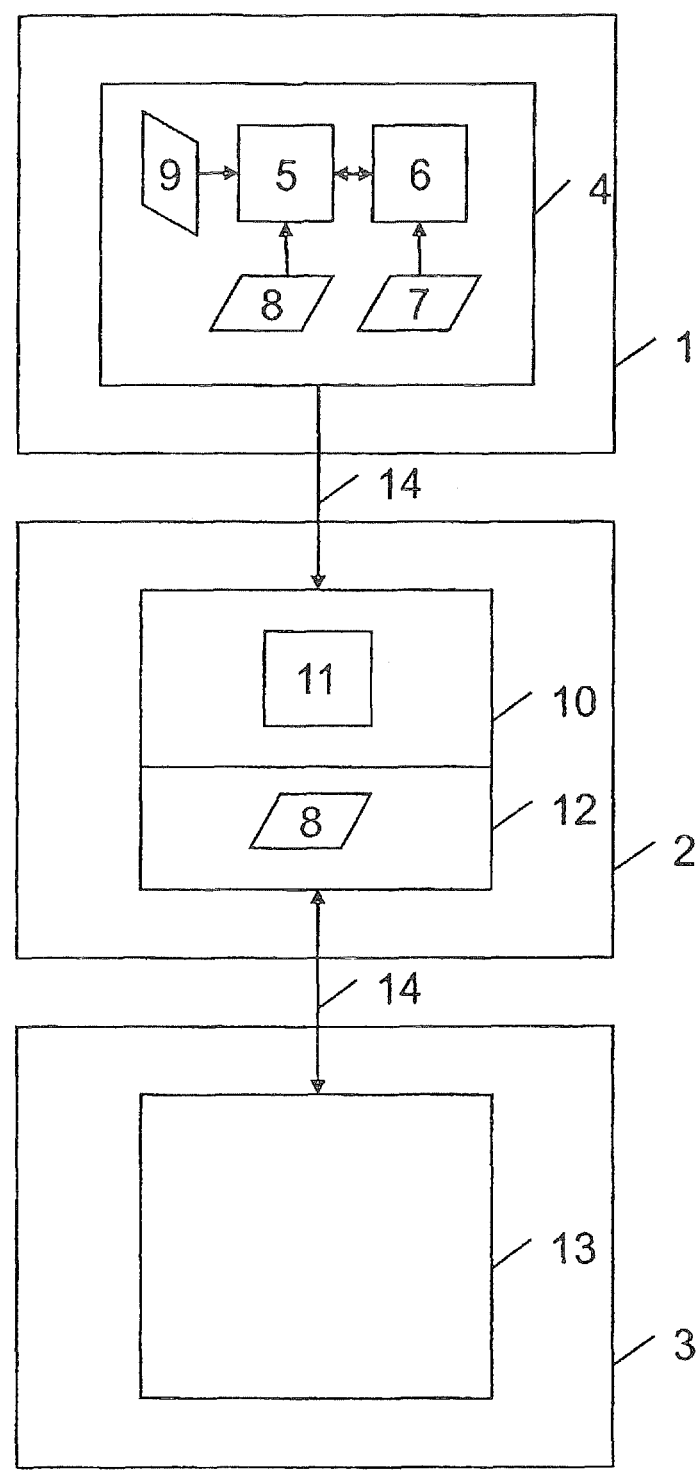
FIG. 1, a computer arrangement comprising a server and a client computer.

FIG. 1 shows a computer arrangement comprising a development computer 1, a server computer 2 and a client computer 3. The development computer I comprises an integrated software development system 4, which in turn comprises a validation enforcement system 5, a program analyzer 6, a software program 7 and an interface description 8. The validation enforcement system 5 has access to a set of validation rules 9.

During development of the software program 7, a programmer provides both the software program 7 and the associated interface description 8. For example, software program 7 may be a web service written in Java, Pearl or any other suitable programming language. The interface description 8 may be provided in the form of a WSDL document comprising XML Schema type definitions for parameters or a CORBA interface description comprising definitions of input parameters and constraints thereon.

At predefined stages in the development process, for example whenever an executable version of the software program 7 is built or deployed by the integrated software development system 4, the program analyzer 6 analyzes the software program 7 such that all input parameters to the software program 7 are known to the integrated software development system 4.

For example, the program analyzer may perform a syntactical analysis of source code of a software program 7. Such a syntactical analysis of a software program 7 is required for other purposes within the integrated software development system 4 as well, particularly the generation of executable program code from the source code, such that an existing program analyzer 6 may be used in this step.

Alternatively, particularly in advanced integrated development systems 4 such as visual development tools, the integrated software development system 4 may request a programmer to specify input parameters and automatically generate corresponding source code for the software program 7. In this case a syntactical analysis is not necessary for the identification of the input parameters, although it may be performed for other reasons.

Once the input requirements of the software program 7 are known to the integrated software development system 4, the validation enforcement system 5 reads the interface description 8 comprising constraints on allowable input parameters and maps these constraints to the input parameters of the software program 7. In the context of this application, the term "constraint" is used to describe any syntactical or other formal requirement on an input parameter. This comprises type definitions, restrictions of permissible ranges of data values or characters and any other means suitable to describe the form of expected input. The validation enforcement system 5 then validates that the constraints comprised in the interface description 8 are complete with respect to the input parameters of the software program 7 and are also correct with respect to the set of validation rules 9. The set of validation rules 9 may be integrated into the validation enforcement system 5 or be provided in form of an electronically readable set of policies adapted to the specific security needs of the software program 7.

In the presented embodiment, both the software program 7 and the interface description 8 are only deployed to the server computer 2, if the validation enforcement system 5 can verify that the interface description 8 complies with the set of validation rules 9 and the input parameters of the software program 7. The server computer 2 comprises an execution environment 10 in which the software program 7 can be executed. For this purpose, the software program 7 may be interpreted by the execution environment 10 or, as in the example presented in FIG. 1, an executable program code 11 corresponding to the software program 7 can be executed by the execution environment 10. The execution environment 10 also has access to the interface description 8. For example, in FIG. 1, a copy of the interface description 8 is comprised in the execution environment 10. Alternatively, access to the interface description 8 comprised in the development computer 1 can be granted to the execution environment 10 over a data network 14. The interface description 8 is used by a validation system 12 comprised in or operationally connected to the execution environment 10.

The client computer 3 comprises a client program 13 adapted to access the executable program code 11 of the software program 7 by means of the data network 14. For example, the client program 13 may send a request to the server computer 2 comprising an input value for the software program 7. Such a request may be, for example, a SOAP request encoded in XML format and exchanged using the Hyper Text Transfer Protocol (HTTP).

The input value comprised in the request of the client program 13 is validated by the validation system 12 of the server computer 2. For this purpose, constraints for the input parameter of the software program 7 specified in the interface description 8 are compared with the input value specified in a particular request. If the input value of a request violates any of the constraints specified in the interface description 8, the request is not forwarded to the executable program code 11 of the software program 7. If, however, the input value provided to the server computer 2 from the client program 13 by means of the data network 14 is valid with respect to the interface description 8, the validation system 12 passes the received request on to the executable program code 11 in the execution environment 10. The executable program code 11 corresponding to the software program 7 can then respond to the transmitted request by, for example, returning a result or performing a requested action.

Although the development computer 1, the server computer 2 and the client computer 3 are shown as separate devices in FIG. 1, the functionality of all three entities may be provided by a single system or cluster system or any other computer arrangement suitable for inter-process communication. Consequently, the data network 14 may be implemented as a local or wide area network, a software interface or any other means suitable for exchanging data between different computer programs, services or processes.

The integrated software development system 4, the execution environment 10, the validation system 12 and the client program 13 may be implemented in part or as a whole in software or hardware or a combination thereof. For example, the validation enforcement system 5 may be provided in form of a separate module, also known as plug-in, to a modular software development system 4. Parts implemented in software may be provided on a computer readable medium embodying software instructions executable by a computer to perform the steps described above. The computer-readable medium may, for example, be a CD-ROM, a flash memory card, a hard disk, or any other suitable computer-readable medium.

FIG. 2 shows an example of an unsafe interface description 20 according to the prior art. The example interface description 20 presented in FIG. 2 was taken from the web service description language (WSDL) 1.1 W3C Note dated Mar. 15, 2001 [retrieved, 22.11.2005, http://www.w3.org/TR/2001/NOTE-wsdl-20010315]. This document is a normative reference for the Web Service Description Language (WSDL).

The presented unsafe interface description 20 is used for an exemplary computer program 7 providing a web service that responds to a given request for a trade price of a specified stock ticker symbol by responding with the associated trade price. The XML Schema code presented in FIG. 2 is only an excerpt of the complete interface description 20 comprised in the cited reference. Apart from a header 21 specific to the XML Schema language, the unsafe interface description 20 comprises definitions for a first element 22 and a second element 23, which are used to input and output data to and from the web service, respectively.

The first element 22 defines a complex type comprising an input parameter 24 to the web service. According to the definition provided in the interface description 20, the input parameter 24 named "tickersymbol" is of type "string", i.e. a character sequence. No further constraints are specified by the first element definition 22.

The second element 23 defines a complex type comprising an output parameter 25 named "price" of type "float", i.e. a floating point numeral. Again, no further constraints are specified for this parameter. Although, from the perspective of the described example computer program 7, the second parameter 25 is used as an output parameter and consequently not safety critical for that computer program 7, it may serve as an input parameter to a subsequent computer program, which may combine data received from the first computer program 7, for example to perform a statistical analysis. For that reason, it is still desirable to validate that the output data for the output parameter 25 complies with an interface description 20.

Assuming that ticker symbols always comprise three alphabetic characters, as this is the case for most stock broker systems, and that associated trade prices denote always positive amounts of a currency, the interface description 20 shown in FIG. 2 is incomplete and thus potentially unsafe. For example, if a computer program 7 passes a character strings received as input parameters 24 onto a further system for processing, for example an external database with a defined field width of three for the ticker symbol, the external system may crash, if a ticker symbol with the length of more than three characters is provided to it. Equally, a computer program 7 blindly accessing the third character of a received input value for the input parameter 24 may crash if the actual input value provided only consists of two characters.

Since prices for stock quotes are assumed to be always positive, returning a negative price for a ticker symbol may cause a receiving computer program to fail. For example, a so-called legacy system such as a database system may use negative numbers to encode error messages rather than valid data values for such a computer program. Consequently, the range of allowable numerals should be limited to positive numbers. In addition, it may be desirable to restrict the output parameter 25 to an upper price limit or a specified number of decimal places.

FIG. 3 shows an improved, safe interface description 30. Apart from the header 21, the interface description 30 comprises a definition for a first element 31 and a second element 32, comprising improved definitions for the input parameter 24 and the output parameter 25, respectively. Rather then just using an existing simple type as done in the definition of the first element 22 and the second element 23 of FIG. 2, the definitions for the first element 31 and the second element 32 presented in FIG. 3 restrict the same base types by providing first and second constraints 33 and 34, respectively.

In the case of the input parameter 24 defined by the first element 31, the first constraint 33 defines that the length of the string used as "tickersymbol" must always be three. Alternatively, other constraints may be provided in forms of regular expressions, for example specifying that the ticker symbols must consist of three alphabetic characters.

In the case of the output parameter 25 defined by the second element 32, the second constraint 34 defines that the minimum value returned as "price" must be greater than zero. Further constraints may be defined for the second element 32, for example an upper bound, in addition to the constraint 34. Such constraints are not included in FIG. 3 for reasons of representational simplicity.

Because now the first element 31 defines bounds for allowable input values for the input parameter 24, input values out with this expected range can be detected by the validation system 12, before they are passed on to the executable program code 11 of the software program 7. In this way, the programmer of the software program 7 is relieved of the duty of providing validation code for validating the input parameter 24 after reception by the software program 7. For example, a programmer of the example computer program 7 does not need to verify that a received ticker symbol is a character string of lengths 3.

FIG. 4 shows a flow chart of a first method 40 for validation of an interface description 8 of a software program 7.

In a first step 41, input parameters 24 of a software program 7 are identified by a program analyzer 6. For example, a syntactical analysis may be performed by an in integrated software development systems 4. The analysis may serve other purposes within the integrated development system 4 as well, for example for syntax highlighting or generation of executable code.

In a step 42, an interface description 8 is requested. For example the integrated software development system 4 may check whether an interface description 8 with a name corresponding to the software program 7 or otherwise associated with the software program 7 is present within a development project. The interface description 8 may be provided by the programmer of the software program 7, be generated automatically or semi-automatically by the software development system 4 or be received over a data network 14. For example, an interface description 8 provided for some open protocol may be imported into a development project comprising the software program 7.

In a step 43, the integrated software development system 4 checks whether an interface description 8 was provided. If no interface description was provided, all further processing is prevented and the method returns to the previous step 42. For example the programmer of the software program 7 can be reminded that he or she needs to provide an interface description 8. If, however, an interface description 8 was provided to the integrated software development system 4 or the validation enforcement system 5, the validation enforcement system 5 analyzes the received interface description 8 in a further step 44.

In step 44, the interface description 8 may be parsed by the validation enforcement system 5 into its syntactical components, such as the element definitions 22, 23, 31 and 32 shown in FIG. 2 and FIG. 3, and mapped to input parameters 24 identified by the program analyzer 6. The validation enforcement system 5 may then validate that for each input parameter 24 requested by the software program 7 a corresponding specification is present in the interface description 8. In addition, the constraints 33 and 34 specified in the interface description 8 are validated with respect to a set of validation rules 9.

In the case of a WSDL or other XML Schema constraints, the set of validation rules 9 may comprise rules preventing the use of particularly known unsafe element definitions 22 or 23. For example, the set of validation rules 9 may prevent the use of "any", "anyType", or "any-SimpleType" elements. In addition, it may prevent unbounded elements within a "complexType" XML Schema type. In a further example, it may prevent the use of the XML Schema type "list". It may also prevent the use of so-called mixed content within a "complexType", i.e. a mixing of structured and unstructured data as known from Hyper Text Markup Language (HTML) documents for example. In addition, the set of rules 9 may preclude the direct use of built-in "simpleType" as presented in the unsafe interface description 20 shown in FIG. 2.

Though the examples presented here are given in the form of WSDL elements, similar expressions can be expressed using other description languages, for example using Document Type Definitions (DTDs), or the Common Object Request Broker Architecture (CORBA) Interface Definition Language (IDL).

In practice, the set of validation rules 9 may represent experiences gathered from earlier attacks to software programs 7 or theoretical insights into software vulnerability. They may be suited to the specific security needs of a developed software program 7, a company provided security policy or a specific software development system 4 or execution environment 10. For example, the set of rules 9 may be defined more loosely for solely locally accessible software programs 7, and more tightly for software programs 7 accessible over an open data network 14 such as the Internet.

The type and amount of constraints expressed as part of the set of validation rules 9 for an interface description 8 will generally depend on the expressive power of a description language used for defining the interface description 8. In the case of WSDL, the language used for providing constraints 33 and 34 is the XML Schema language, which allows specification of a multiplicity of complex constraints.

For example, WSDL allows specification of regular expressions which could be used to prevent the intrusion of control statements by means of providing a malicious input value. As explained in the outset, such control statements, comprising for example so-called escape characters, can be used to execute user provided control statements on a server computer 2. By providing a constraint in the interface description 8, precluding escape characters, for example by means of a regular expression, the injection of control statements bearing a special meaning during execution of the software program 7 can be prevented.

If, in a step 45, it can be verified that all constraints 33 and 34 specified in the interface description 8 comply with the set of validation rules 9, the interface description 8 is provable safe with respect to the provided set of validation rules 9. Consequently, the software program 7 and the interface description 8 may be used to produce executable program code 11, or be deployed from the development computer I to the publicly accessible server computer 2. These optional steps are not, however, shown in FIG. 2.

If, however, the validation performed in step 45 is not successful, the integrated software development system 4 may generate a warning in a step 46 and prevent the generation of executable program code 11 or the deployment of the software program 7. As an additional aid for the programmer, the integrated software development system 4 may highlight the part of the interface description 8 detected to be unsafe with respect to the set of validation rules 9. For example, the integrated software development system 4 may show discrepancies between the types as defined in the software program 7 and the interface description 8 or highlight the specific rule or rules violated by the interface description 8. The programmer can then improve the interface description 8 in order to comply with the set of validation rules 9. The validation process may then recommence at step 42, in which the improved interface description 8 is provided to the validation enforcement system 5.

FIG. 5 shows a flow chart of a second method 50 for validation of input values for a software program 7.

In a first step 51, an interface description 8 is validated with respect to a software program 7 and a predefined set of validation rules 9. This step may comprise, for example, the steps performed by the steps 41 to 46 of the method 40 shown in FIG. 4.

In a second step 52, the software program 7 or corresponding executable program code 11 is provided together with the interface description 8. For example, the executable program code 11 generated by the development computer 1 from the software program 7 can be transferred over a data network 14 from the development computer 1 to the server computer 2. In addition, the associated interface description 8 is also transferred from the integrated software development system 4 of the development computer I to the validation system 12 of the server computer 2.

In a next step 53, the validation system 12 receives an input value for an input parameter 24 of the software program 7. For example, a SOAP request may be transferred from the client program 13 of the client computer 3 to the validation system 12 of the server computer 2.

In a step 54 the validation system 12 validates the received request comprising the input value. For example, the validation system 12 may check whether the received request refers to a known interface description 8. If the received request does not refer to any interface description 8, or the interface description 8 it refers to is unknown to the validation system 12, it may reject the request without further checks. If, however, the request refers to an interface description 8 comprised in the validation system 12 or accessible to it, the validation system 12 analyzes the constraints 33 and 34 comprised in the interface description 8.

For example, the validation system 12 may read the WSDL interface description 30 and extract the type definition 31 used for the input parameter 24. Equally, the validation system 12 may parse the received request in order to map the input value contained therein to the constraint 33 comprised in the interface description 30. This can be achieved, for example, by mapping element names specified in a WSDL document to input parameter names 24 comprised in a SOAP request. The validation system 12 then validates that the constraint 33 expressed in the interface description 8 is adhered to by the received request. This can be achieved, for example, by using a validating XML parser for parsing the SOAP request. By definition, a validating XML parser must raise an exception if a received request does not comply with an interface description 30 provided, which can be used for detecting or handling a validation error.

Of course, in a more complex example as presented in FIG. 3, an interface description 30 may comprise more than a single input parameter 24 and more than a single constraint 33 on it. A received request must comply with all constraints applicable to all input parameters contained therein in order to be considered safe in this more general case.

In a step 55, the validation system 12 can thus decide whether a received request is valid with respect to the interface description 8. If, for example, an exception was raised by a validating parser, or elements contained in a request could not successfully be mapped to an input parameter 24 defined in the interface description 8, the validation system 12 will reject the received request in a step 56. If, however, all input values comprised in a request comply with the constraints of the interface description 8, the request is safe and can be forwarded to the software program 7 or the corresponding executable program code 11.

LIST OF REFERENCE SYMBOLS 1 development computer
2 server computer
3 client computer
4 integrated software development system
5 validation enforcement system
6 program analyzer
7 software program
8 interface description
9 set of validation rules
10 execution environment
11 executable program code
12 validation system
13 client program
14 data network
20 unsafe interface description
21 header
22 first element 23 second element
24 input parameter
25 output parameter
30 safe interface description
31 first element
32 second element
33 first constraint
34 second constraint
40 first method
41-46 steps of the first method
50 second method
51-56 steps of the second method

The invention claimed is:

1. An integrated software development system, comprising:
   a program analyzer, as executed by a processor, adapted to identify input parameters of a software program in development;
   a validation enforcement system, as executed by said processor, adapted to enforce that an interface description associated with the software program in development complies with a predefined set of validation rules is provided for the input parameters of the software program at a development time by parsing into respective syntactical components and mapping the respective syntactical components to the input parameters to ensure that interface descriptions are complete with respect to the input parameters;
   a code generator, as executed by said processor, adapted to generate executable program code for the software program; and
   a software deployment system, as executed by said processor, adapted to deploy the software program to a target system,
wherein the generation of code is prevented if the validation enforcement system is unable to validate the interface description successfully against the predefined set of validation rules, and
wherein the deployment of the software program is prevented if the validation enforcement system is unable to validate the interface description successfully against the predefined set of validation rules.

* * * * *